Figure 1:
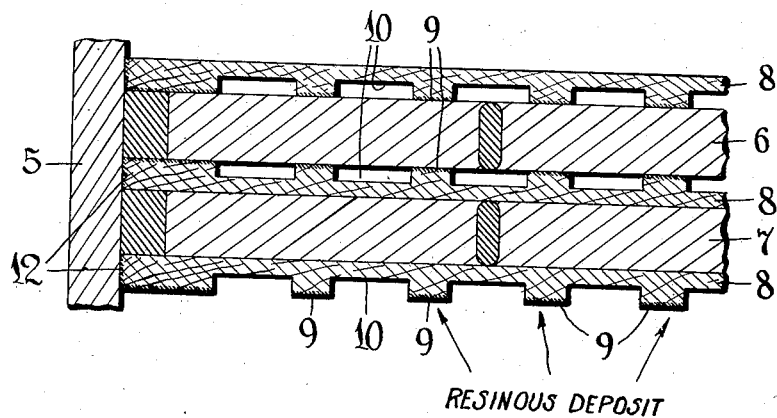

March 26, 1940.    C. H. RASCH    2,195,134

SEPARATOR PLATE AND METHOD OF MAKING SAME

Filed July 29, 1937

RESINOUS DEPOSIT

RESINOUS DEPOSIT

INVENTOR
Carl H. Rasch,
BY
Beau, Brooks, Buckley & Beau.
ATTORNEYS

Patented Mar. 26, 1940

2,195,134

UNITED STATES PATENT OFFICE 2,195,134

SEPARATOR PLATE AND METHOD OF MAKING SAME

Carl H. Rasch, North Tonawanda, N. Y.

Application July 29, 1937, Serial No. 156,353

12 Claims. (Cl. 136—149)

This invention relates to separators for storage batteries and more particularly to a separator having a reinforced surface and to a method of reinforcing the surface thereof.

It is an object of the present invention to prolong the life of the usual separator plates used in storage batteries, to increase their wearing qualities when in use, to make possible the employment of softer woods than that presently used, to decrease the tendency for a short circuit to be produced between adjacent plates of the battery and to improve upon the form of separators now generally used without adversely affecting the function thereof.

In accordance with the procedures of the present invention separator plates are treated to increase their porosity and to this end the formed separators, if of wood, are steamed or placed in a relatively strong alkali solution or are treated with a suitable solvent. This treatment, preferably carried out at relatively elevated temperatures, removes the gums, resins, salts and the like, pulps the wooden separators with water, reduces the brittleness of the thin wooden separators and increases the porosity thereof. The strength of the alkali solution may be any strength desired and this strength will vary depending upon the type of wood treated, the quantity of material to be removed and the temperature of treatment. After the treatment with the alkali, generally caustic alkali such as sodium hydroxide and the like, residual sodium hydroxide or other alkali may be removed from the separator plate by thoroughly washing or rinsing the same until the last traces of alkali have been removed, although with certain kinds of wood this is unnecessary, and only a partial wash need be employed. The caustic treated separator, while still pulped upon the interior, is allowed to drain to remove superficial moisture from the surface of the plate but the moisture in the interior cells is not removed. This procedure may be hastened by passing a gas heated to a moderately elevated temperature over those portions of the separators to be treated in a fashion about to be described and for a time sufficient to remove the skin or surface moisture and then the separator is reinforced upon those portions where wear is encountered, as, for instance, the edges coming in contact with the side walls of the battery and the ridges or lands where contact with the battery electrode produces wear upon the separator.

The strengthening and impregnating material used is preferably a solution of resin compatible with the liquid in the cells of the pulped separator and to this end an aqueous solution of a water soluble resin, as for instance, a caustic alkali solution of resins such as the phenol formaldehyde or urea aldehyde types, or alkali caseinate treated with aldehyde is employed.

The resin solution compatible with the fluid in the cells of the separator is applied to the porous separator at those portions to be reinforced. The solution may be rolled, brushed or sprayed upon the edges and upon the ridges or lands or those portions of the separator to be treated are immersed in the treating solution. As the treating solution is compatible with the fluid in the pulped cells of the separator, the treating solution enters the cells to a slight distance below the surface of the separator, probably induced by osmotic phenomena. The reinforcing material of the treating solution is then fixed in the wood by treating the separator with a fixing agent such as an aciduous material. In general, acids such as sulfuric, hydrochloric, acetic and the like, may be used to this end, although certain acid salts such as alum and the like may be employed.

The aciduous material is applied to the portions of the separator containing the resin solution in any convenient fashion, the alkali is neutralized, the resin deposited in small discrete particles and is set up on the surface and adjacent the surface of the separator producing a hard wear resistant surface and a separator possessing unimpaired porosity.

With respect to the coating of resin, applicant desires to point out that a continuous and therefore impervious layer of resin is not produced due to the fact that the water soluble resin, as for instance, the alkali solution, when treated with acid, forms a white milky suspension comprising small, discrete particles of resin. Upon being cured or set up each individual particle of resin is hardened without fusion with other adjacent resin particles.

Figure 2:
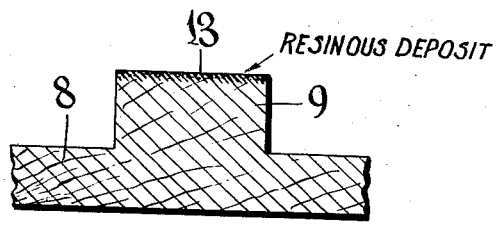

In the drawing,

Fig. 1 is a fragmentary section of a battery showing an assembly of electrodes with the improved separators, and Fig. 2 is an enlarged fragmentary section of a separator.

Referring more particularly to the drawing a side wall of a conventional form of battery container is shown at 5. Assembled within the container is a positive electrode 6 and negative electrode 7 comprising the conventional grid carrying active material.

Separating the electrodes from one another are porous insulating elements or separators 8. The separators may be made of any porous material, although wood is generally employed. The separators are formed with spaced ridges or lands 9 which bear against one of the electrodes, as for instance, the positive electrode 6, the recessed portions 10 forming channels in which the electrolyte of the battery may circulate and through which any gas generated at the electrode may rise to the top of the battery.

At the surfaces of the lands 9 and to a slight depth within the interior thereof, a porous resinous deposit is formed by precipitating resin from a water solution of resin. Edges 12 of separators 8 may also be treated as the edges wear against the side wall 5 of the battery container.

In Fig. 2 is shown enlarged a separator 8 and land or ridge 9. At the surface of the land and extending a slight distance below the surface is the reinforcing material 13.

In general the reinforcing material is anchored to the surface and into the body of the separator and does not decrease the discharge rate of the battery as contrasted with one having untreated separators.

From the foregoing it will be seen that the present invention provides a reinforced separator that is porous, resistant to wear of the electrodes due to relative movement of the electrodes and separators and one that can be produced economically and expeditiously.

What is claimed is:

1. A separator for storage batteries comprising a relatively thin sheet of porous material having spaced lands extending across a face of the sheet, said lands having deposited thereon and to a slight distance below the surface thereof, a hard resinous material in small, discrete particles.

2. A separator for storage batteries comprising a relatively thin sheet of wood having spaced lands extending across a face of the sheet, said lands having deposited thereon and to a slight distance below the surface thereof a phenol aldehyde resin in small, discrete particles.

3. A separator for storage batteries comprising a relatively thin sheet of wood having spaced lands extending across a face of the sheet, said lands having deposited thereon and to a slight distance below the surface thereof a urea aldehyde resin in small, discrete particles.

4. A separator for storage batteries comprising a relatively thin sheet of wood having spaced lands extending across a face of the sheet and a synthetic resinous deposit in small, discrete particles upon the face of said lands, the remainder of the separator being free of the resinous coating.

5. A separator for storage battery electrodes having thin porous portions and thicker portions adapted to bear against the plates, the surfaces of the thicker portions being reinforced by addition of a hardened resin in discrete form.

6. The process of treating a porous separator having spaced ribs which comprises treating the separator with an alkaline solution and washing the same to remove alkali soluble materials from the separator, removing surface moisture, and then treating the faces of the ribs with a water soluble resinous material.

7. The process of treating a porous separator which comprises treating the separator with an alkaline solution and washing the same to remove alkali soluble materials from the separator, removing surface moisture, and then treating the separator at surfaces subject to wear in use with a water soluble resinous material.

8. The process of treating a porous separator which comprises immersing the separator in an alkaline solution and washing the same to remove alkali soluble materials from the separator, removing surface moisture, and then treating the separator at surfaces subject to wear in use with a water soluble resinous material.

9. The process of treating a porous separator which comprises heating the separator in an alkaline solution and washing the same to remove alkali soluble materials from the separator, removing surface moisture and then treating the separator at surfaces subject to wear in use with a water soluble resinous material.

10. The process of treating a porous separator which comprises treating the separator with an alkaline solution and washing the same to remove alkali soluble materials from the separator, removing surface moisture, applying a solution of a water soluble resin to surfaces of the separator subject to wear in use and then fixing the resin with an acidulous material.

11. The process of treating a porous separator which comprises treating the separator with an alkaline solution and washing the same to remove alkali soluble materials from the separator, removing surface moisture, applying a solution of a water soluble resin to surfaces of the separator subject to wear in use and then fixing the resin with a mineral acid.

12. The process of treating a porous separator which comprises treating the separator with an alkaline solution and washing the same to remove alkali soluble materials from the separator, removing surface moisture, applying a solution of a water soluble resin to surfaces of the separator subject to wear in use and then fixing the resin with sulfuric acid.

CARL H. RASCH.

CERTIFICATE OF CORRECTION.

Patent No. 2,195,134. March 26, 1940.

CARL H. RASCH.

It is hereby certified that error appears in the printed specification of the above numbered patent requiring correction as follows: Page 2, second column, line 3, claim 5, for the word "plates" read --electrodes--; and that the said Letters Patent should be read with this correction therein that the same may conform to the record of the case in the Patent Office.

Signed and sealed this 14th day of May, A. D. 1940.

(Seal)

Henry Van Arsdale,
Acting Commissioner of Patents.